(12) United States Patent
Duroux et al.

(10) Patent No.: US 6,638,454 B2
(45) Date of Patent: Oct. 28, 2003

(54) PLASTIC GLASS

(75) Inventors: Bernard Duroux, Garancieres (FR); Roger Settier, Samois sur Seine (FR)

(73) Assignee: Schefenacker Vision Systems France S.A. (FR)

( * ) Notice: Subject to any disclaimer, the term of this patent is extended or adjusted under 35 U.S.C. 154(b) by 0 days.

(21) Appl. No.: 09/897,863

(22) Filed: Jul. 2, 2001

(65) Prior Publication Data

US 2003/0001301 A1 Jan. 2, 2003

(51) Int. Cl.$^7$ .............................. B29C 45/56; G02B 5/10
(52) U.S. Cl. ..................................... 264/40.5; 264/328.7
(58) Field of Search .................. 264/40.5, 2.2, 264/328.7

(56) References Cited

U.S. PATENT DOCUMENTS

| | | | | | |
|---|---|---|---|---|---|
| 4,540,534 A | * | 9/1985 | Grendol | ....................... | 249/82 |
| 4,836,960 A | * | 6/1989 | Spector et al. | ................ | 264/2.2 |
| 5,552,094 A | * | 9/1996 | Kubota | ........................ | 264/2.2 |
| 5,741,446 A | * | 4/1998 | Tahara et al. | ................. | 264/1.9 |
| 6,124,886 A | * | 9/2000 | DeLine et al. | .............. | 340/433 |

OTHER PUBLICATIONS

Wang, T. James, "Numerical Simulation and Process Window Design of Injection/Compression Molding", Society of Plastics Engineers, ANTEC 1999, 7 pages.*

* cited by examiner

*Primary Examiner*—Jill L. Heitbrink
(74) *Attorney, Agent, or Firm*—Warn, Burgess & Hoffmann, P.C.

(57) ABSTRACT

A method of manufacture of high optical quality transparent plastic for use as a mirror or glass substitute.

22 Claims, 3 Drawing Sheets

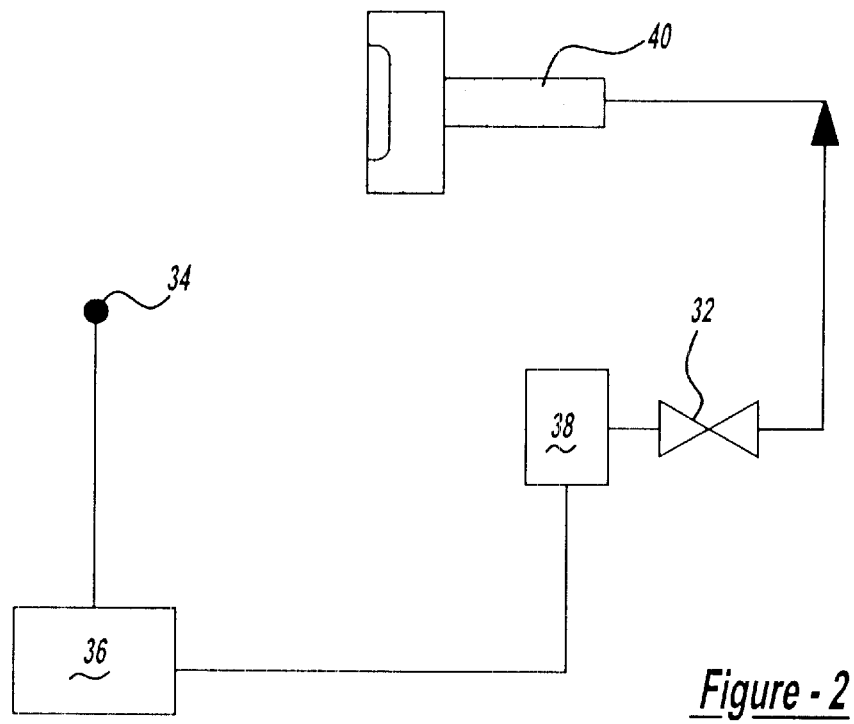
*Figure - 2*
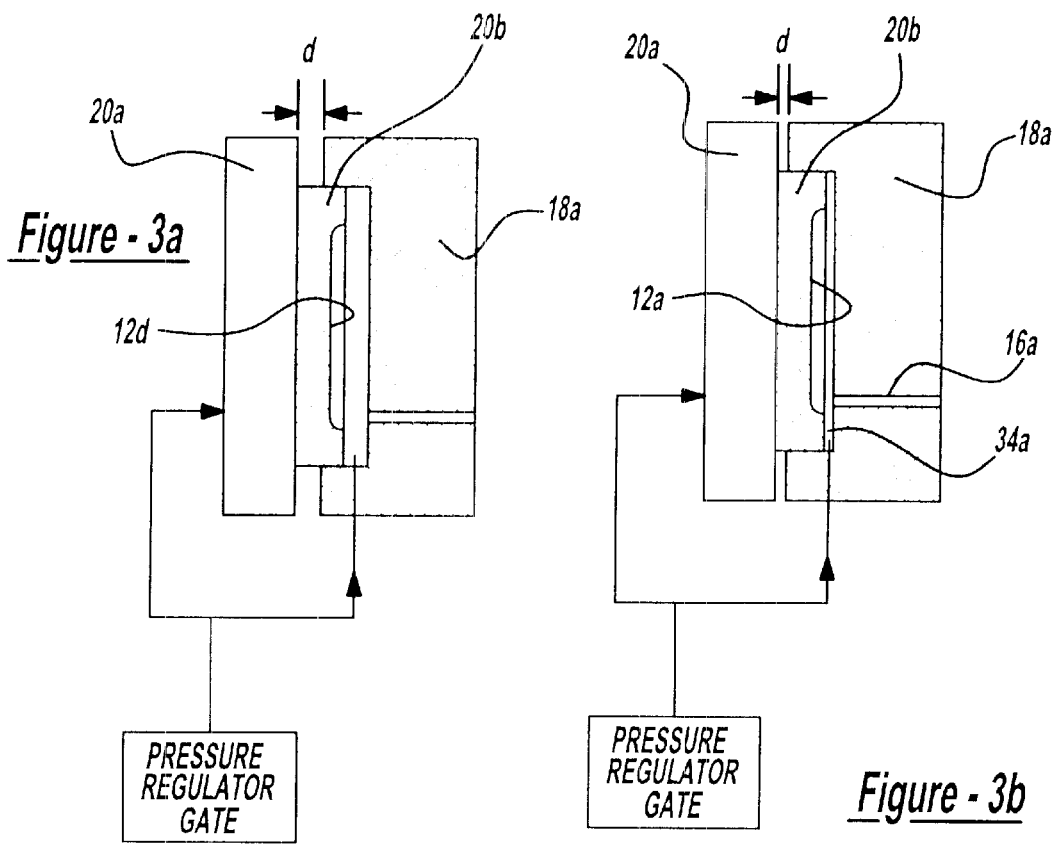
*Figure - 3a*     *Figure - 3b*

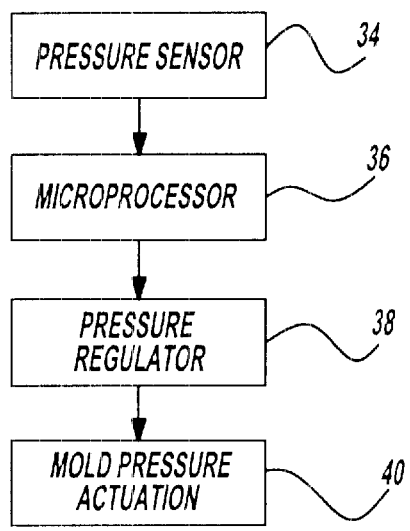
*Figure - 4*
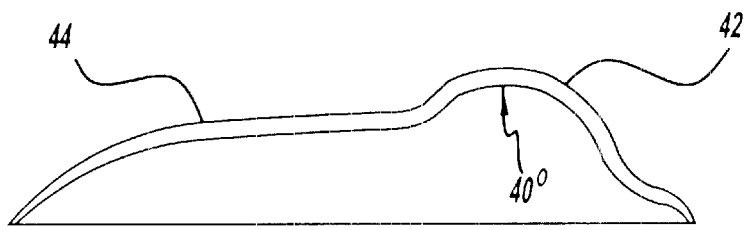
*Figure - 5a*
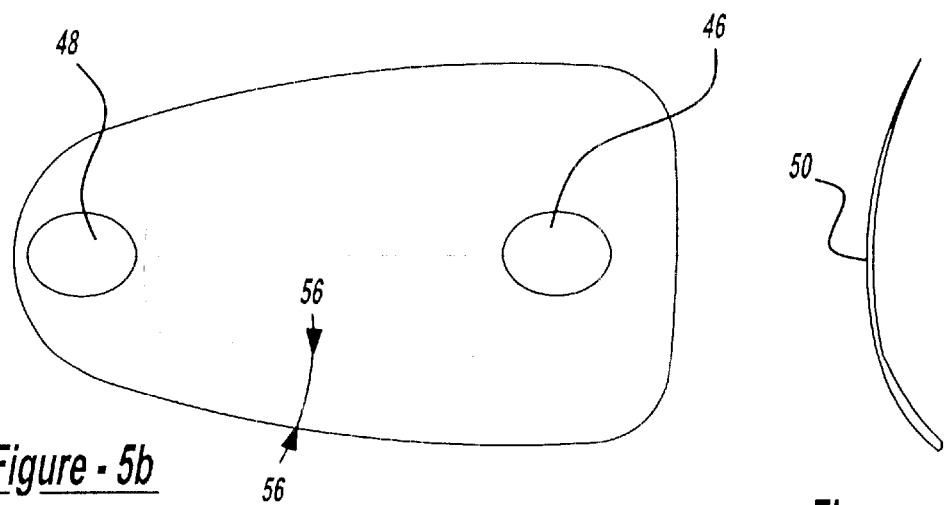
*Figure - 5b*
*Figure - 5c*

PLASTIC GLASS

TECHNICAL FIELD

This application relates to the manufacture of a plastic material which has optical qualities suitable for use in mirrors or the like. More specifically, the present invention relates to a process or manufacture of a plastic glass material which is roughly optically equivalent to glass mirrors which are currently in production.

BACKGROUND OF THE INVENTION

It has long been desirable to utilize plastic materials in vehicle constructions for replacement of glass areas. While glass mirror surfaces are generally adequate for use in vehicle mirrors and the like, the glass mirrored surfaces have several drawbacks. First, the glass is relatively heavy and relatively fragile and, thus, both weight savings and safety considerations would be well served by replacement of standard glass mirrors with a plastic substitute. Secondly, a glass mirrored surface typically does not lend itself to any type of concave or convex bends which may be desirable in certain sophisticated mirror designs.

Therefore, it has been a goal in the art to provide a suitable substitute for glass in mirror construction. In mirrors which have been made with plastic, it has typically been problematic to provide the mirror surface such that the mirror portion transmits through the plastic. The transmissive qualities of most plastics have not been adequate to use in mirror functions, due to various problems with plastic optical properties and aberrations during molding of these materials. Typically, an external mirrored surface does not provide the desired optical quality compared to that of a mirrored glass surface.

Thus, if a mirrored glass surface could be provided using plastics, this would open up various concave, convex or fish-eyed designs or the like, and would provide a lighter vehicle, which is desirable in vehicle construction of today, and would reduce the vibrations inherent in glass mirrors.

SUMMARY OF THE INVENTION

In accordance with the present invention, there is provided a process for producing plastic materials suitable for use in a vehicle mirror, comprising first providing an injection mold machine having a cavity therein for forming of a transparent plastic article for simulating glass. The mold includes a pressure sensing and regulating apparatus in the throat of the injection screw. The mold is closed and injected with a clear plastic material. A portion of the mold is thereafter used to pressurize the mold material back into the injection port. Thereafter, the mold is held at a predetermined pressure for optimizing optical properties of the plastic material. This results in a plastic material which has similar optical properties to glass. Thereafter, a mirrored coating is placed on the surface of the plastic material to provide a suitable substitute for a final plastic glass mirror.

A further understanding of the present invention will be had in view of the description of the drawings and detailed description of the invention, when viewed in conjunction with the subjoined claims.

BRIEF DESCRIPTION OF THE DRAWINGS

FIG. 2 is a schematic diagram showing the control aspects of the present invention;

FIGS. 3a and 3b are cross-sectional schematic views showing the alternate embodiment of the mold useful in the present invention;

FIG. 4 is a block diagram showing the process steps involved in preparation of the application;

FIG. 5a is a cross-section of a mirror showing a contoured reflective surface which can be accomplished by use in the present invention;

FIG. 5b is a plan view of a mirror showing contoured fish-eye or other protections or contours which may be accomplished using the present invention; and FIG. 5c is a sectional view taken along FIG. 5c—5c of FIG. 5b, showing the type of contour which may be utilized in the present invention.

DETAILED DESCRIPTION OF THE PREFERRED EMBODIMENTS

Figure 1:
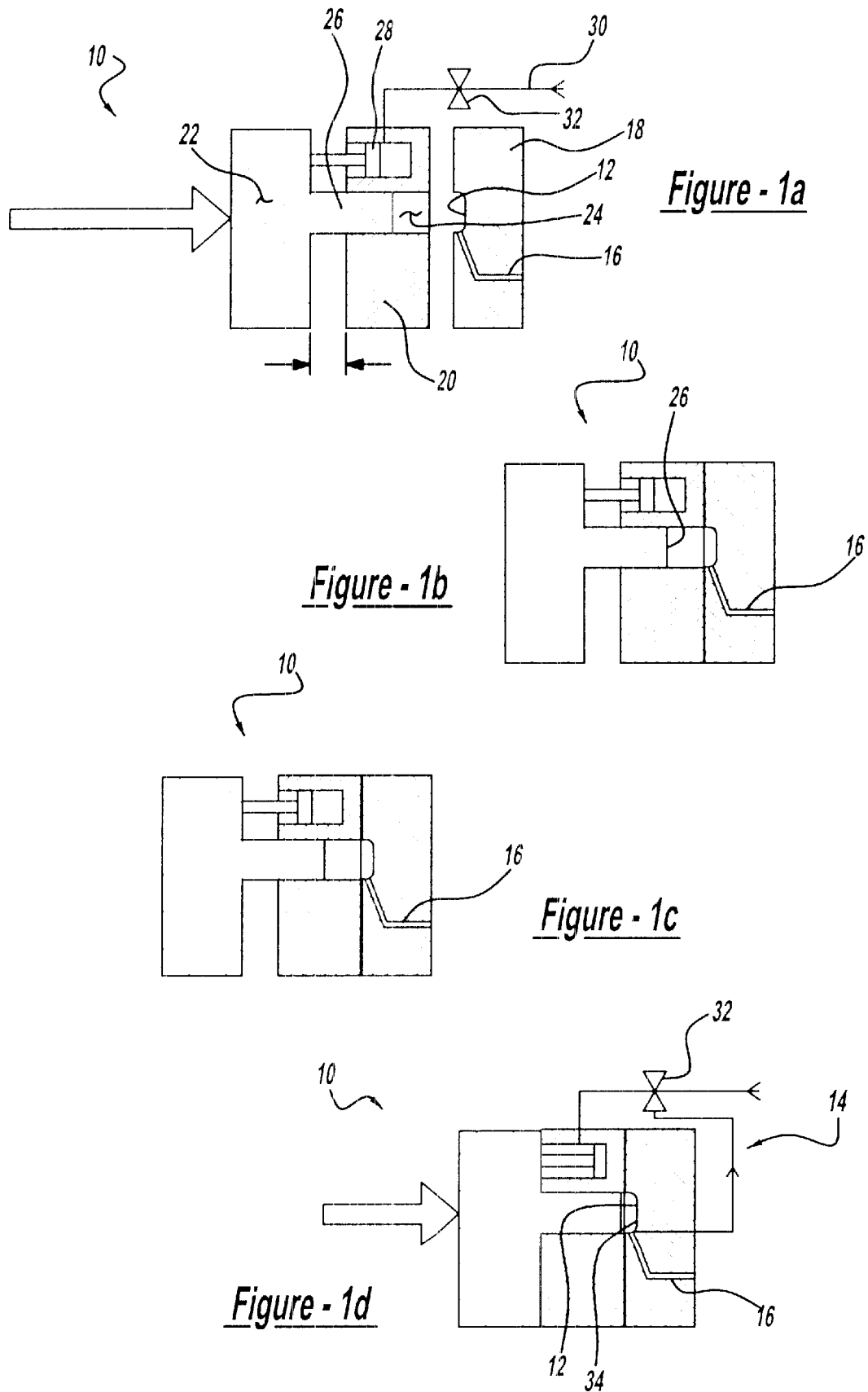
FIGS. 1a through 1d are sectional views of a mold apparatus demonstrating the use of the present invention.

In accordance with present invention, as illustrated in the drawings, there is provided a process for molding plastic materials suitable for use as a vehicle mirror. The process includes the steps of first providing an injection mold machine, generally shown at 10. The injection molding machine 10 includes a cavity 12 therein, for forming a transparent plastic article simulating the transparency of glass. The mold 10 includes a pressure sensing and regulating apparatus, such as that generally shown at 14 in FIG. 1(d). The mold 10 is thereafter closed, as shown in FIG. 1(b), and a clear plastic material is injected into the mold through a port 16. A portion of the mold is used to pressurize the mold material back into the injection port 16. After the material is partially injected back into the injection port, the mold is held at a predetermined pressure for optimizing optical properties of the plastic material, to provide a clear transparent plastic material which has optical properties similar to glass.

As shown in FIGS. 1(a) through 1(d), there is provided a first mold platen 18 and a second mold platen 20. The first mold platen 18 includes the cavity 12 for production of the final finished part. A second movable piston portion 22 is provided, which includes a cavity 24, which is adjustable by movement of the piston 26. The pressure in cavity 24 is adjusted by way of the hydraulic smaller control piston 28, which is set forth for use in a control system 30, which hydraulically can compress or adjust the hold position of the moveable portion 22. As shown in FIG. 1(d), a proportional valve 32 may be utilized in the control system for controlling the adjustment of the pressure in the mold cavity 12. A pressure sensor 34 is utilized to determine the pressure in the cavity, for purposes of the hold pressure in the subject process. After this, the proper pressure is determined and the mold cavity is held at this pressure by way of the control system linked to the proportional valve 32.

The control circuit for the hydraulics of the present invention is set forth in the schematic figure of FIG. 2. As shown in FIG. 2, a sensor 34 in the mold cavity sends signals to microprocessor 36. Microprocessor 36 calculates the proper pressures of the present process and sends this information to control 38, which controls the operation of proportional valve 32 for controlling the cavity pressure by way of the piston 40, which is utilized in FIGS. 3(a) and 3(b), or alternatively to the hydraulic control piston 28 as shown in FIGS. 1(a) through 1(d). The process is shown in the block diagram of FIG. 4 also. Such microprocessors are available from DEMAG ERGOTECH GmbH, Altdorfer Strabe 15, D-90571 Schwaig. One skilled in the art is able to program the desired programming parameters as set forth in the teachings herein.

Now referring to FIGS. 3(a) and 3(b), there is shown an alternate method of conducting the process wherein the mold cavity itself may be utilized for control of molding pressure can be accomplished in this manner for use in the present invention. Referring to FIGS. 3 and 3(b), an injection port 16(a) is provided in mold halves 18(a) and 20(a). A sensor 34(a) is provided for sensing the pressure of the plastic injected into the cavity. In this embodiment, the mold halve 20(a) is hydraulically or mechanically controlled for adjusting the distance of the mold portion 20(b). In this embodiment, the mold plunger portion 20(b) includes molding cavity 12(a) in its mold plunger portion 20(b). In this embodiment, a control system as in FIG. 2 or 4 may be utilized for controlling pressure to the portion 20(a).

Referring to FIGS. 5(a) through 5(c), there is shown a sample mirror in which various contours of the mirror can be presented as may be desired. For instance, a fish eye portion 42 could be provided in combination with a convex curvature surface to provide expanded mirror coverage, such as shown at 44. FIG. 5(b) shows an alternative embodiment where two fish eye portions 46 and 48 are provided on another convex-type mirror surface, as shown in Line 5c—5c, being designated by numeral 50. This gives options which were hard to create using glass type mirrors or the like. Set forth in Table 1 are the particular parameters of the molding of the plastic glass of the present invention.

As set forth above, after initial injection of the plastic into the mold cavity, a quantity is pushed back into the entry sprue as part of the method of the present invention. Generally, from about 20 to about 60%; typically 30 to 50%; and preferably about 40% by volume of the material injected is forced back into the injection sprue 16 prior to curing of the material.

Preferably, the mold is then held at a pressure of generally from about 900 bar to about 1800 bar, preferably from about 1000 bar to about 1800 bar and preferably from about 1000 bar to about 1200 bar.

It has been found that by using these steps, a glass-like transparency can be obtained. Utilizing these steps helps relieve internal tension in the material therefore removing barriers to optical clarity which otherwise might arise.

Mold temperatures for use in the present invention vary depending on the material used. Typically, suitable temperatures are from about 80 to 120° C. A most preferred temperature of about 80° C. is utilized in the present process.

Typical plastics used in the present invention include optical grade injection moldable material, optical grade polycarbonates, methacrylates or methacrylate modified polycarbonates. Suitable materials are obtainable from General Electric, for instance, plastics sold under the trade designations MAKROLON 2207 and LEXAN LSI are particularly suitable in processes of the present invention. Also, it is necessary to provide optical quality polished mold surfaces to maintain the optical properties of the finished part.

Subsequent heat treatment of the part which may occur due to protective or reflective coatings which may be applied do not detrimentally affect or degrade the mirrors of the present invention. This is due to the step of maintaining the part under the pressures specified at molding temperature. Generally, dwell times at temperature are from about 0.1 to 60 seconds. Typical dwell times at temperature are from about 10 to 50 seconds, with preferred dwell times being from about 18 to 25 seconds.

Because the plastic is allowed to harden at an elevated temperature and pressure, subsequent treatments requiring heat, such as adding reflective coatings, do not adversely affect the optical properties of the plastic.

Those skilled in the art can now appreciate from the foregoing description that the broad teachings of the present invention can be implemented in a variety of forms. Therefore, while this invention has been described in connection with particular examples thereof, the true scope of the invention should not be so limited, since other modifications will become apparent to the skilled practitioner upon a study of the drawings, specification and following claims.

What is claimed is:

1. A process for producing plastic materials comprising:
    (a) providing an injection mold machine having a cavity therein for forming of a transparent plastic article simulating glass, said mold including a pressure sensing and regulating apparatus;
    (b) closing the mold and injecting a clear plastic material into the mold and using a portion of the mold to pressurize the mold such that a portion of the mold material is forced back into an injection port formed in the mold, the injection port being in communication with at least a portion of said cavity of said mold; and
    (c) maintaining the mold at a predetermined pressure wherein internal stress in said plastic material is reduced for optimizing optical properties of said plastic material to be similar to glass for mirrors;
    wherein a vehicle mirror element is formed from said plastic material.

2. The process of claim 1 wherein a first portion of said mold includes a mold cavity; and a second portion is adapted for pressurizing said cavity after molten plastic is injected therein.

3. The process of claim 2 wherein the second portion includes a piston for applying pressure so as to force molten plastic back through the injection port.

4. The process of claim 3 wherein said pressure from said piston is held on the cavity for a period of time of from about 0.01 to about 60 seconds.

5. The process of claim 3 wherein said plastic is allowed to cool under while said pressure is applied for a predetermined time.

6. The process of claim 5 wherein a second piston is used for controlling pressure.

7. The process of claim 5 wherein the predetermined time is from about 10 to about 50 seconds.

8. The process of claim 1 wherein the pressure is maintained in the cavity at greater than about 900 bar.

9. The process of claim 1 wherein the pressure is maintained in the cavity from about 1000 to about 1800 bar.

10. The process of claim 1 wherein the pressure is maintained in the cavity at from about 1000 to about 1200 bar.

11. The process of claim 9 wherein the temperature is maintained at about 80° C.–120° C. for a time period of from 18 to 25 seconds while the cavity is maintained under pressure.

12. A process for producing plastic materials comprising:
    (a) providing an injection mold machine having a cavity therein for forming of a transparent plastic article simulating glass, said mold including a pressure sensing and regulating apparatus and control for monitoring and controlling injection molding parameters of pressure and volume;
    (b) closing the mold and injecting an initial volume of a clear plastic material in to the mold and using a portion of the mold to force from about 20% to about 60% of the mold material back into an injection port formed in the mold, the injection port being in communication with at least a portion of said cavity of said mold; and (c) maintaining the mold at a predetermined pressure of greater than about 900 bar for reducing shrinkage and internal stress in the plastic material for optimizing optical properties of said plastic material to be similar to glass for mirrors;

wherein a vehicle mirror element is formed from said plastic material.

13. The process of claim 12 wherein a first portion of said mold includes a mold cavity; and a second portion is adapted for pressurizing said cavity after molten plastic is injected therein.

14. The process of claim 13 wherein the second portion includes a pressure adjustment control piston operatively connected to a mold cavity piston for forcing molten plastic back through the injection port.

15. The process of claim 12 wherein said pressure is maintained in the mold for a time of from about 0.01 to about 60 seconds.

16. The process of claim 15 wherein said plastic is allowed to cool while said pressure is applied for a predetermined time.

17. The process of claim 12 wherein a piston is used for controlling pressure.

18. The process of claim 16 wherein the predetermined time is from about 10 to about 50 seconds.

19. The process of claim 12 wherein the pressure is maintained in the cavity at from about 1000 to about 1900 bar.

20. The process of claim 12 wherein the pressure is maintained in the cavity at from about 1000 to about 1200 bar.

21. The process of claim 12 wherein the temperature is maintained at about 80° C.–120° C. for a time period of from 18 to 25 seconds while the cavity is maintained under pressure.

22. The process of claim 12 wherein a reflective material is formed on a surface of said transparent plastic article for forming a mirror.

* * * * *